Aug. 10, 1948.   R. V. KLEINSCHMIDT   2,446,880
DISTILLATION AND HEAT EXCHANGE APPARATUS
Filed June 28, 1941   6 Sheets-Sheet 4

INVENTOR
Robert V. Kleinschmidt
BY Kenyon & Kenyon
ATTORNEYS

Patented Aug. 10, 1948

2,446,880

UNITED STATES PATENT OFFICE 2,446,880

DISTILLATION AND HEAT EXCHANGE APPARATUS

Robert V. Kleinschmidt, Stoneham, Mass., assignor to Arthur D. Little, Inc., Cambridge, Mass., a corporation of Massachusetts Application June 28, 1941, Serial No. 400,354

27 Claims. (Cl. 202—187)

This invention relates to distillation apparatus and to heat exchange apparatus adapted for use in a distillation operation. My apparatus is applicable to the handling of fluids and is especially applicable to separating components of a fluid mixture or two or more substances by reason of their difference in boiling point or volatility, in those cases where the initial mixture and the separated components are liquids during some portion of the operation, but these liquids may be more or less concentrated solutions of solids, liquids or gases in liquids or liquid mixtures of materials normally in solid or gaseous form in the pure state. Any such liquid mixture is referred to herein as a solution. The term distillation refers generally to operations which are sometimes referred to as fractionation, rectification, evaporation, concentration, etc., which are characterized by the evaporation of a portion of a liquid mixture.

It is a purpose of this invention to provide distillation apparatus of the type wherein a vapor is removed from a vaporization chamber, compressed to a pressure at which the condensing temperature is above the boiling point of the solution, and brought into out-of-contact heat exchange relation with solution in the chamber, which apparatus not only has high heat exchange efficiency and low heat losses but also is economical to manufacture and may be readily assembled and disassembled for cleaning.

Features of this invention relate to the construction of the heat exchanger which utilizes conical shaped coils of piping, the coils being nested together in close proximity but so as to permit flow of a fluid in passage means therebetween in out-of-contact heat exchange relation with a fluid, e. g., a condensing vapor, in the piping. Other features relate to the headering and assembly of these coils and to the utilization of conical shield members, in certain cases, between the conical coils and to the location and relative size of the shield members.

Features of this invention also relate to the construction of the liquid-vapor separator and to its relation with respect to the heat exchanger. Other features relate to the vent line for removing liquid from the separator and to the disposition of a thermometer in a vapor line leading from the interior of the vaporization chamber. Other features relate to the manner of mounting the compressor in relation to the vaporization chamber, liquid-vapor separator, and headers for the exchanger and to means for assembling and disassembling these parts of the apparatus in relation to each other and to the other parts of the apparatus.

Further purposes, features and advantages of this invention will be apparent in connection with the following description of certain illustrative embodiments thereof shown in the accompanying drawings wherein.

Referring to the embodiment of this invention shown in Figs. 1 to 8, the apparatus comprises a vaporization chamber 15 which is suspended from support members 16 by bolts 17. Also carried by the support members 16 and by the bolts 17 is a casting or mounting plate 18 to the upper side of which there is secured a compressor 19. Suspended from the casting 18 and secured thereto by bolts 20 is a baffle member 21 forming part of a liquid-vapor separator, the term "liquid-vapor separator" as used herein referring to chamber-like passage means wherein vapor evolved from a boiling solution is maintained out of contact with the boiling solution and in such condition that droplets of liquid entrained in the vapor will become separated from the vapor. The liquid-vapor separator here shown is indicated generally by the reference character 22. In the casting 18 are apertures 23 which communicate between the interior of the liquid-vapor separator and the passages 24 associated with the compressor. The compressor may be of the Roots-Connersville type comprising two co-acting impeller members 25 which impel vapor withdrawn from the liquid-vapor separator downwardly through the aperture 26 in the casting 18.

The compressor may be operated by any suitable motor 27 which may, for example, be an electric motor. The compressor may be operated from the motor by any suitable driving means such as a belt 28.

Within the vaporization chamber, there are a plurality of conical coils of piping, the coils being nested together in close proximity to each other and with the larger ends of the coils upward in the vaporization chamber. Each coil is composed of a plurality of lengths of piping or tubing 29 (for example, six), coiled together so that a vapor or liquid passing through the upper ends of each of the six lengths of tubing will pass through the composite coil in parallel relation to each other. These intercoiled lengths of tubing or piping will be referred to as coil elements forming part of conical coils as a whole. The conical coils are indicated by the reference characters 30, 31, 32, 33, 34, 35, 36, 37, 38 and 39. In order to introduce vapor compressed by the compressor into the interior of the coils 30 to 39, suitable headering arrangement is used which, in the present embodiment of this invention, is of the following construction:

The casting 18 includes an annular passage 40 and passages 41 leading from the aperture 26 to the annular passage 40. Communicating with the annular passage 40 and extending downwardly therefrom are vertical headers 42, 43, 44, 45, 46 and 47. The lower portions of these vertical headers may be secured to the upper portions by the detachable unions 48, but the detachable unions 48 may, if desired, be omitted. The lower end of the aperture 26 is covered by a detachable plate 94.

As mentioned above, each of the cone-shaped coils comprises a plurality of lengths or coil elements of coiled piping. Thus, for example, the conical coil indicated generally by the reference character 30 comprises six coil elements 30a, 30b, 30c, 30d, 30e, and 30f. The upper end of the coil element 30a communicates with the header 42 and is attached thereto by a suitable detachable union 49. In a similar way, the coil elements 30b, 30c, 30d, 30e and 30f communicate with the headers 43, 44, 45, 46 and 47 respectively and are attached thereto by the unions 50, 51, 52, 53 and 54 respectively. In a similar way, the six coil elements of each of the conical coils 31 to 39 are secured by detachable connections to the headers 42 to 47 by detachable unions and so as to communicate therewith at different vertical positions along the vertical headers as is clearly shown in the drawings, particularly Figs. 4 and 5. In the drawings, the sections of the piping in the mid-portion of the coils have been omitted for clarity in the showing, but it is to be understood that the piping is continuously coiled from top to bottom of the coils.

Figures 5, 5A:
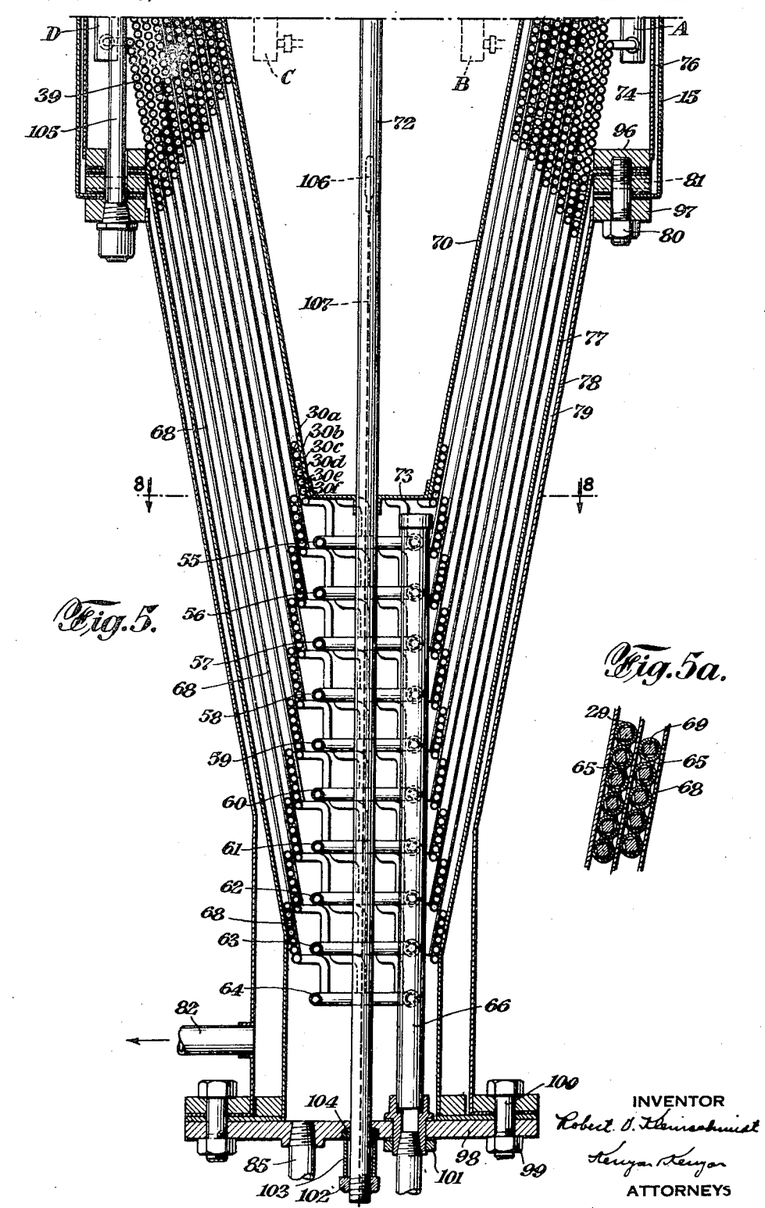
Fig. 5 is a side elevational view partly in section of the lower portion of the apparatus shown in Fig. 1, Fig. 5 being a continuation of the apparatus shown in Fig. 4.
Fig. 5A is a side elevational detail view of some of the nested coils shown in Fig. 5, the showing in Fig. 5A being on an enlarged scale.
Figure 6:
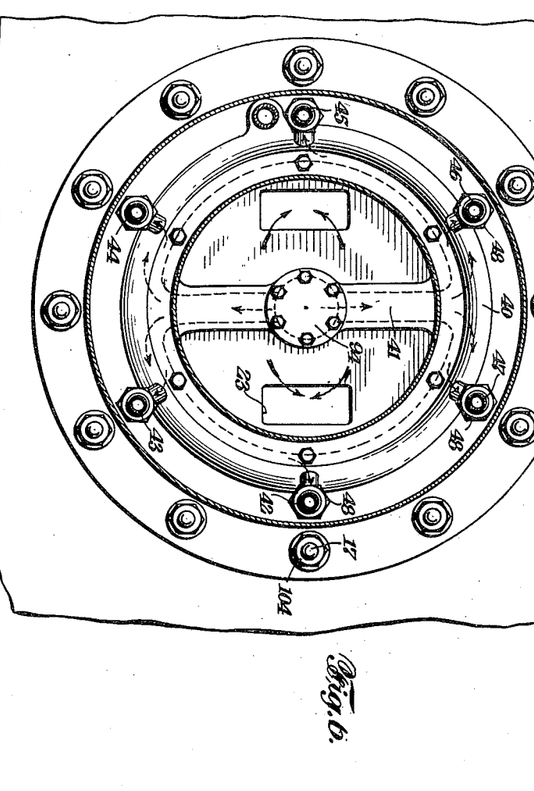
Fig. 6 is a cross-sectional view of the apparatus shown in Fig. 4 taken on the line 6—6.
Figure 7:
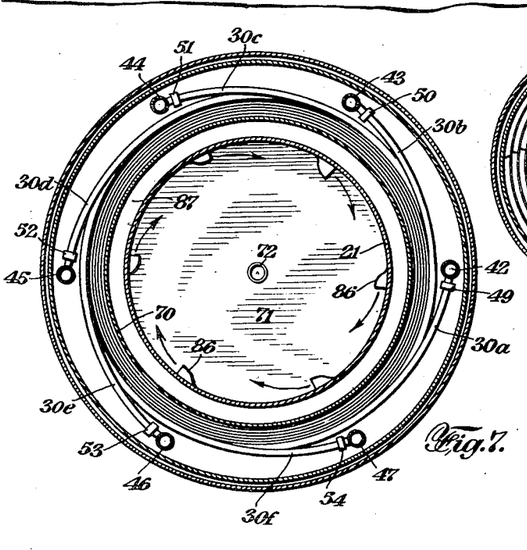
Fig. 7 is a cross-sectional view of the apparatus shown in Fig. 4, taken on the line 7—7.
Figure 8:
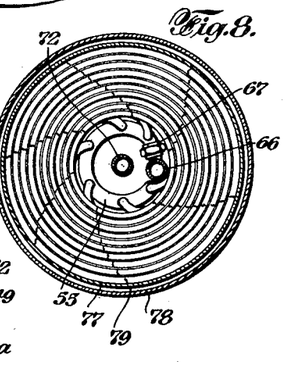
Fig. 8 is a cross-sectional view of the apparatus shown in Fig. 5, taken on the line 8—8.

The lower ends of the coil elements communicate with suitable headering means which may be of the construction shown in Figs. 5 and 8. As shown in these figures, each of the conical coils 30 to 39 communicates with headers 55, 56, 57, 58, 59, 60, 61, 62, 63 and 64 respectively. The attachment of the coil elements to these headers may be illustrated with reference to the conical coil 30 and the header 55. Each of the coil elements 30a, 30b, 30c, 30d, 30e and 30f communicates with the header 55 and is secured thereto by soldering or brazing. As more clearly shown in Fig. 8, each of the headers 55 to 64 is interrupted by the vertical draw-off or header line 66 and is attached thereto by a detachable union 67.

The piping 29 of the coil elements of the coils 30 to 39 is wound so that the coil elements will contact each other and preferably the coil elements are maintained in this condition by brazing 65 (see Fig. 5a). This in effect makes each coil a rigid shell that constitutes an easily-handled detachable unit and that prevents any liquid from passing from one side to the other side. While somewhat the same effect can be had by winding the coil elements snugly together (the brazing 65 being omitted), it is desirable to use the brazing 65 or some similar means for positively uniting the lines of contact between the coil elements of the individual coils.

Between each of the coils 30 to 39 are disposed conically-shaped sheet metal spacing means 68 which may be referred to for the sake of brevity as shields. These shields extend from the lower portion of the conical coils and preferably do not extend completely to the upper end of the conical coils, but discontinue approximately at the point at which boiling begins to occur during the operation of the apparatus. The conical coils and shields, therefore, are nested together in contact with each other throughout the lower portion of the conical coils and the conical coils are out of contact with each other in the region above the shields. By this construction, small tortuous passages are provided between the exterior surface of the piping of the coils and the conical shields. These passages become of larger total cross-sectional area in the region between the coils that extend above the shields.

Within the conical coil elements is disposed a filler element 69, which is preferably in the form of a square wire and which restricts but does not fully fill the cross-sectional area of the interior of the piping. This filler element normally extends from the bottom of each conical coil element up to approximately the region of the upper end of the conical shield that is in contact with the inner side of the coil. These filler elements serve to restrict the cross-sectional flow capacity of the piping in the lower portion of the conical coils, and are adapted to prevent any substantial amount of vapor, e. g., steam, from entering the portion of the tubing containing the wire in the manner and for the purpose described in my application Serial No. 371,298, filed December 23, 1941, now Patent 2,339,862 dated January 25, 1944, for Apparatus for and method of distillation. In addition to a restriction in the tubes of the coils that is afforded by the upper end of the square wire or other polysided wire or rod, the restriction may be afforded by other means as described in my said Ser. No. 371,298, and such restriction preferably should be adjacent the upper end of the shield that is in contact with the inner side of the coil.

Inside of the coil 30 is nested the baffle sheet 70, the lower end of which is conical and serves to direct the flow of incoming solution among the tortuous passages between the conical coils and the upper cylindrical end of which serves as a baffle forming part of the liquid-vapor separator 22. A plate 71 forming the bottom of the liquid-vapor separator is secured as by welding to the conical portion of the baffle sheet 70, and leading from the bottom of plate 71 is a vent line 72, adapted to direct any liquid collected in the liquid-vapor separator out of the system. At the bottom of the baffle sheet 70 is another plate 73 which seals the bottom portion of the baffle sheet 70 and through which the vent line 72 passes in liquid-tight connection therewith.

In order to maintain a normal liquid level in the vaporization chamber 15 and provide means for withdrawing hot concentrated solution during the distillation operation, a cylindrical wall member 74 is provided in spaced relation to the wall of the vaporization chamber 15. The level of solution in the vaporization chamber is determined by the top edge 75 of the wall 74. Liquid which flows over the top edge 75 of the wall 74 will pass downwardly through the annular space 76 between the walls. The lower portion of the apparatus is also arranged with a double wall. An inner-wall member 77 is in contact with the outermost of the conical coils, namely, coil 39. Spaced from the wall 77 is the outer wall 78 so that an annular conically-shaped passage 79 is provided between these walls. The walls 77 and 78 are suspended from the outer wall of the vaporization chamber 15 by the bolts 80, and the bolts 80 are arranged with suitable spacing means so as to provide passages 81 affording communication between the annular passages 76 and 79. The wall 74 is secured as by brazing to the ring member 96 with which the bolts 80 are threadedly engaged. Similarly, the wall 78 may be secured to the ring member 97 as by brazing. The concentrated solution which collects in the bottom of the passage 79 is taken off through outlet line 82, which is provided with a "water leg" 83, that is adapted to keep the annular passage 79 flooded during the operation of the apparatus.

The solution to be distilled is fed into the apparatus by any suitable means, e. g., from tank 84 through line 85 controlled by valve 186, the tank 84 being at sufficient elevation to provide a suitable gravity head. Alternatively, the solution can be fed into the apparatus by a positive displacement pump, the rate of feed being determined by the rate of operation of the pump as described in my application Serial No. 371,298, filed December 23, 1940, for Apparatus for and method of distillation upon which Patent No. 2,339,862 issued January 25, 1944.

In the lower portion of the baffle 21 are louvers 86, so that vapor which is evolved from solution in the vaporization chamber and which is directed downwardly through the passage 87 between the baffles 21 and 70 will have imparted thereto a revolving motion within the liquid-vapor separator 22.

If desired, a valve controlled by-pass may be employed between the compression side of the compressor and the interior of the vaporization chamber so as to facilitate the institution of a distillation operation as described in my Patents Nos. 2,185,595 and 2,185,596.

Figures 1, 2, 3:
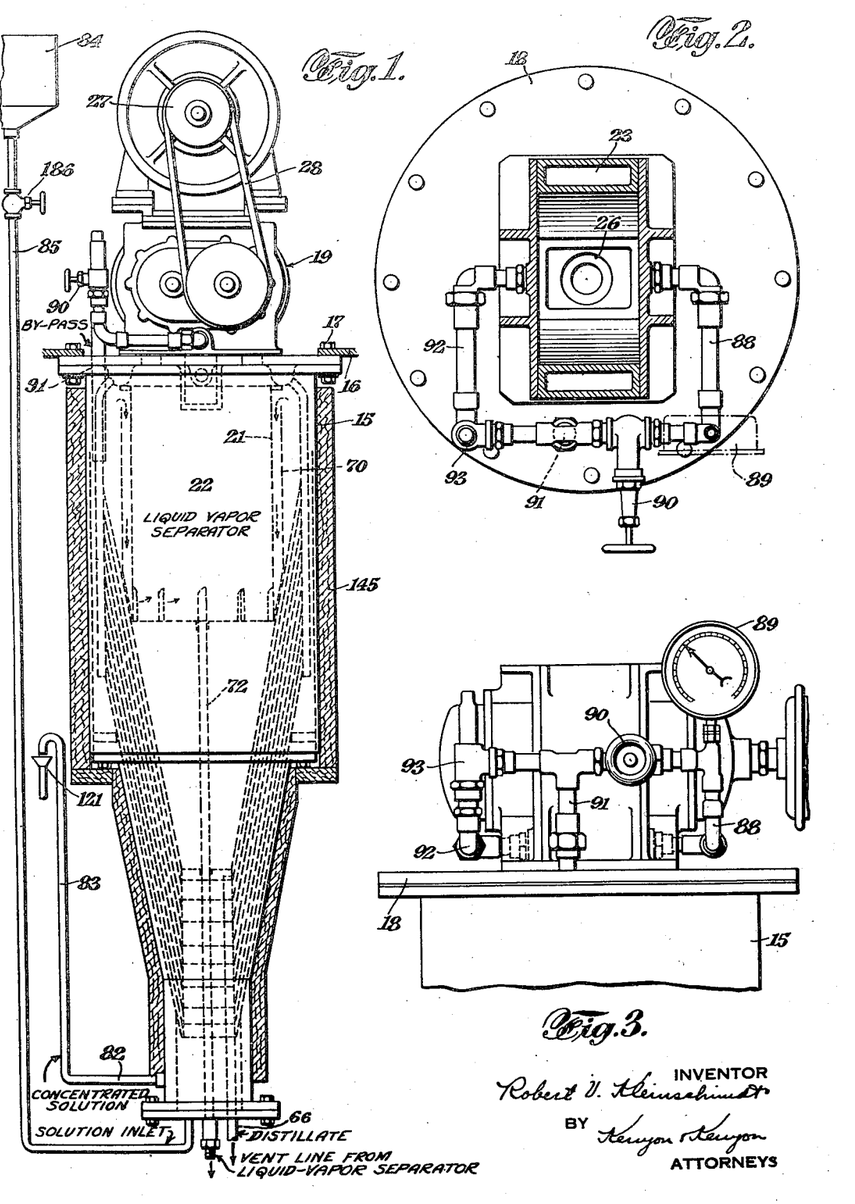
Figure 1 is a side elevational view partly in section and partly schematic showing one form of distillation apparatus embodying this invention.
Fig. 2 is a detail plan view partly in section, showing the piping arrangement used in connection with the compressor forming part of the apparatus shown in Fig. 1.
Fig. 3 is a detail end elevational view of the piping shown in Fig. 2.
Figure 4:
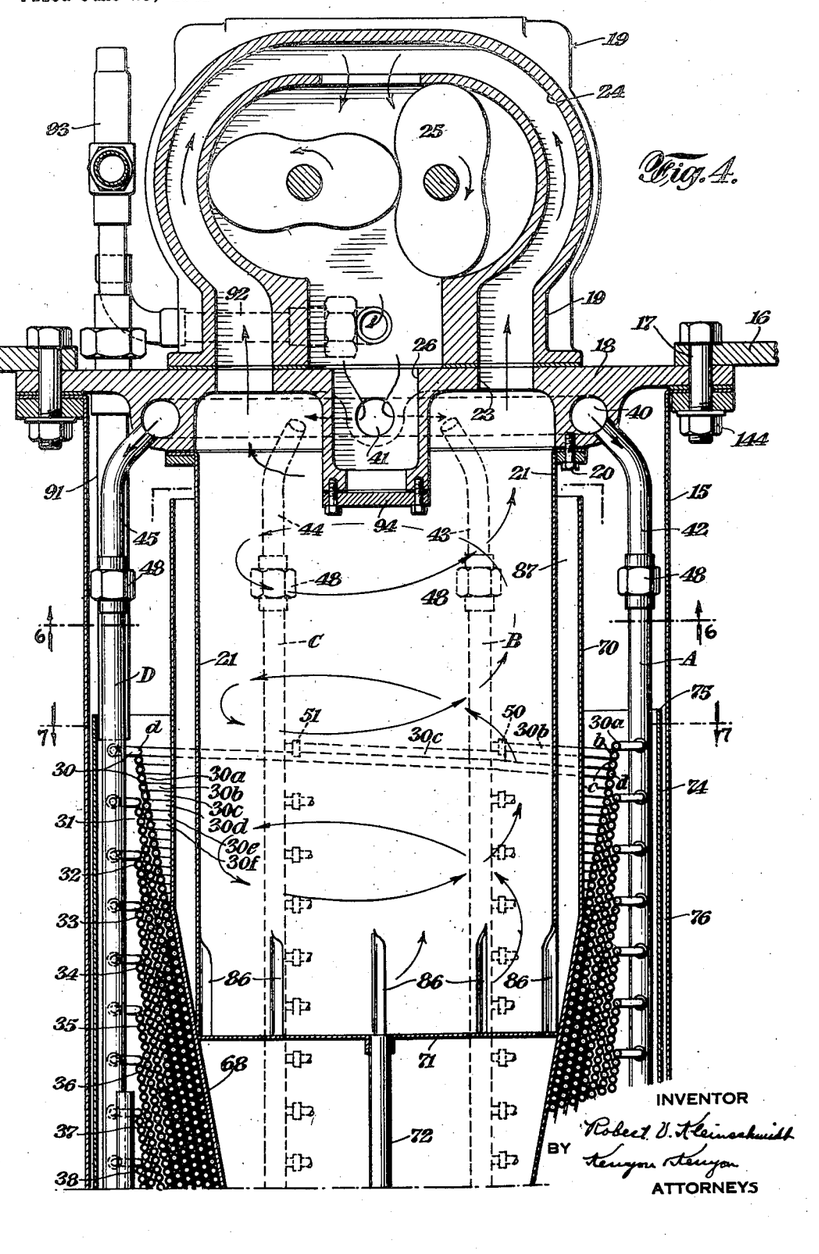
Fig. 4 is a side elevational view partly in section showing on a larger scale the compressor and the upper portion of the vaporization chamber of the apparatus shown in Fig. 1.

One form of by-pass is shown in Figs. 2, 3 and 4. On the compression side of the impellers 25 is a line 88, which for convenience may have associated therewith pressure gauge 89. The line 88 is controlled by a valve 90 and communicates with a line 91 that extends downwardly into the vaporization chamber and has an outlet adjacent the normal liquid level in this chamber. Another line 92 also leads from the pressure side of the impellers 25 and is controlled by a pressure relief valve 93. The line 92 also communicates with the line 91 that extends into the vaporization chamber. By the arrangement described, vapor compressed by the compressor may be by-passed through the lines 88 and 91 (valve 90 being open) into the vaporization chamber so as to assist in starting distillation. As soon as sufficient vapors are formed in the vaporization chamber to maintain distillation, the valve 90 may be closed so that all of the compressed vapor is directed into the conical coils. If, for some reason, the pressure created by the compressor should become undesirably great, the pressure relief valve which normally remains closed will operate so as to automatically by-pass the compressed vapor back into the vaporization chamber and thereby relieve any unduly high back pressure on the compressor.

It is apparent from the foregoing that the distillation apparatus can be very readily assembled and disassembled for the purpose of cleaning the apparatus. In distillation apparatus of the type herein described, wherein vapor is evolved from a solution being distilled and then is condensed while in heat exchange relation with the solution, the heat exchangers have a tendency to form a scale thereon which should be removed from time to time. If the exchangers are in the form of relatively small tubing with narrow passages therebetween, there is a tendency for the coils of tubing to become cemented together. According to this invention, this difficulty is avoided by the utilization of conical coils which are nested together and can readily be separated one from another. Preferably the conical coils have an included angle of approximately 20° to 35°.

The separation of the coils one from another is also facilitated by the conical shields which space the coils apart. With the arrangement shown above, it is apparent that the lowermost of the conical coils can be detached from the other coils by the detachable unions hereinabove described and dropped away from the remaining coils. The remaining conical coils of tubing and the shields likewise may be removed one by one for cleaning. The conical shields facilitate the separation of the coils of piping and likewise permit the manufacture of coils which are identical and which are all wound in the same direction. This is very advantageous from the point of view of manufacturing expense, inasmuch as all of the coils of the apparatus may be made identical both as to dimensions and direction of winding.

The conical shields not only facilitate the separation of the conical coils and their assembly and disassembly, but also serve to increase the efficiency of the heat exchanger. The conical shields serve to form, together with the exterior surface of the piping, long tortuous passages of small cross-sectional flow capacity which have the effect of causing solution flowing therethrough to move at high velocity and thereby increase the efficiency of the heat exchange relation. Moreover, since the shields are in contact with the tubing of the conical coils, they serve somewhat to increase the heat transfer surface and in this manner increase the efficiency of the heat exchanger.

But since the shields have less heat transferring power than the piping, they do not tend to become covered with an adherent scale or other deposit and this facilitates disassembling the apparatus after use.

By discontinuing the shields adjacent the upper end of the coils, the cross-sectional flow capacity of the passages between the conical coils is increased adjacent the upper ends thereof. This is desirable inasmuch as vapor begins to form to considerable extent adjacent the upper ends of the coils and additional space is required for handling the vapor that is formed. The deposit or scale that tends to form on the piping in the heat exchanger is hardest in the region where the incoming solution begins to boil. Where the solution actively boils, the deposit tends to be soft and easily removed. At the lower or cold end of the coils, high velocities of solution are particularly useful and the shields preferably extend down through this region so as to accomplish this purpose. Preferably the shields extend upwardly from adjacent the bottom or smaller ends of the coils through about ⅔ to ⅞ the side wall length of the conical coils.

It may also be mentioned that the filler members 69 decrease the cross-sectional flow capacity of the piping of the conical coils throughout the extent thereof that is occupied by the filler members. When these members are in the form of square wires, the cross section of the tubing is decreased to about ⅓ the cross section without the square wires. This serves to increase the rate of flow of condensate going down through the piping and maintains the entire body of flow in close proximity to the heat exchanging surfaces, and thereby increases the efficiency of the heat exchange relation between the condensate and the solution going through the passages on the outside of the piping. In the upper portion of the conical coils, the filler members 69 are omitted inasmuch as increased flow capacity is desirable in the upper portion of the coils, wherein the vapor is condensing.

If it is desired to disassemble the part of the apparatus wherein the solution is heated and vaporized, the base plate 98 is first removed from the bottom of the apparatus. This can be done by removing the nuts 99 from the bolts 100 and by removing nuts 101 and 102. The nut 102 is in threaded engagement with the vent line 72 and is spaced from the lower surface of the plate 98 by a spacing member 103, which bears against the packing 104 when the nut 102 is tightened down. When the nut 102 is tightened down, this operation not only serves to compress the packing 104 against the surface of the vent line 72 so as to provide a liquid-tight joint, but also serves to draw down the baffle sheet 70 so as to compress the conical coils and shields between the baffle sheet 70 and the wall 77, thereby bringing the surfaces of the piping of the conical coils and of the shields into intimate contact and also pressing the baffle sheets 70 and the wall 77 against the conical coils immediately adjacent thereto.

When the nuts 99, 101 and 102 are removed, the bottom plate 98 may be lowered away. Moreover, by removing the nuts 144 from the bolts 17, the side walls of the vaporization chamber may be lowered away leaving the conical coils and the detachable unions for securing them to the headering means available for detachment. The double walls on the outside of the apparatus may be separated from each other by removing the bolts 80 so that the inner surfaces thereof may be cleaned if desired. As aforesaid, the conical coils can be readily lowered away one by one for cleaning and reconditioning. When the uppermost of the conical coils has been detached from the headering means, this coil, together with the baffle sheet 70 may be lowered away and if desired, the baffle 21 may also be removed by removing the bolts 20.

It is apparent from the foregoing that all of the parts of the apparatus which might require cleaning and reconditioning from time to time may be disassembled very simply without disturbing the mounting plate or casting 18 or the compressor 19 secured thereon. The reassembly of the apparatus is of course, the reverse of the disassembly which has just been described and can be accomplished very quickly and easily. It may also be noted that the apparatus is supported at a region that is approximately at the center of gravity of the apparatus and in such a way as to permit light and relatively inexpensive sheet metal parts for the portion of the apparatus wherein the solution is heated and vaporized.

Usually it is preferable to encase the apparatus with a suitable heat insulation material or lagging 145. It may be mentioned that the construction herein described minimizes heat losses due to the manner of mounting the compressor in relation to the vaporization chamber. The upper portion of the vaporization chamber and the compressor are at the highest temperatures during operation. At the top of the vaporization chamber there is no surface whatever which is exposed to the atmosphere inasmuch as the compressor occupies the upper surface of the vaporization chamber. Therefore, heat losses must escape laterally through the casting 18. It may also be noted that the compressed vapors which have the highest temperature during the operation of the apparatus are conducted back into the vaporization chamber while on the interior of the apparatus so that heat losses from the compressed vapors are reduced to a minimum.

To facilitate the institution of the distillation operation, heating elements 105 may be provided in the space between the wall member 74 and the conical coils. These heating elements can conveniently be ordinarily immersion heaters heated by electricity and inserted into the interior of the vaporization chamber through holes in the ring members 96 and 97 as best shown in Fig. 5.

In utilizing the apparatus hereinabove described, the solution to be distilled may be fed into the apparatus through the feed line 85. In instituting distillation the solution is fed into the apparatus until the solution overflows the upper edge 75 of the wall member 74. Operation of the compressor is then started and if desired, the heating elements 105 may be heated so as to assist in heating the solution in the vaporization chamber to its boiling point. During this interval, the valve 90 is open so that the air and vapor that is compressed by the compressor is by-passed back into the vaporization chamber. The work performed by the compressor during this interval assists in heating the surface of the solution to its boiling point so that vapor will be evolved therefrom. As the amount of evolved vapor increases the air is gradually discharged from the system and the vapor begins condensing in the upper portion of the conical coils. Eventually the condensation of the compressed vapors in the coils will supply sufficient heat for maintaining the distillation. The valve 90 is then closed and the heating elements are de-energized.

During the distillation the compressed vapor condenses in the upper portion of the conical coils. This portion of the conical coils does not contain the filler elements which occupy the lower portion of the conical coils. The condensed vapor continues to flow down through the conical coils in the portion thereof occupied by the filler elements. The heat which is released during the condensation of the compressed vapor causes solution in the spaces on the outside of the piping of the conical coils to boil with evolving of vapor therefrom. To replace the boiling solution, fresh solution is continuously fed into the system through the line 85 and the cold solution is directed through the tortuous passages between the conical coils and shield members. The solution is preheated as it passes upwardly through these passages and eventually is heated to its boiling point. This normally occurs at approximately the upper edge of the shields 68. In other words, the conical coils have two zones, one of which is a vaporization zone in which boiling solution is maintained in out-of-contact counter-flow heat exchange relation with condensing vapor. The other and lower zone is a preheater zone wherein the incoming solution is directed in out-of-contact counter-flow heat exchange relation with hot condensate condensed in the vaporization zone.

It is to be noted that the hot concentrated solution which is removed from the vaporization chamber also is brought into out-of-contact counter flow heat exchange relation with solution entering the system. The annular space 79 between the walls 77 and 78 remains flooded with the hot concentrated solution and the solution is thereby maintained in heat exchange relation with the passages between the wall 77 and the outermost of the conical coils through which incoming solution flows. The construction of an apparatus having outside overflow means is described in greater detail, together with modifications thereof, in my application executed on even date for Apparatus for distillation and heat exchange (Serial No. 400,355, filed June 28, 1941 upon which Patent No. 2,398,184 issued April 9, 1946), and features of this construction are described and claimed in that application.

In feeding the incoming solution into the system, it is preferably introduced at a pressure which is four to twelve inches of water in excess of the pressure maintained on the interior of the vaporization chamber. Normally, the interior of the vaporization chamber is maintained in communication with the atmosphere and, therefore, is at atmospheric pressure. When such is the case, the solution is usually fed in at a gauge pressure of about four to twelve inches of water. The difference in pressure between the interior of the vaporization chamber and the feed can be maintained due to the tortuous character of the passages through which the incoming solution passes in being preheated and vaporized. By employing a pressure differential of the above mentioned character, more uniform feeding of the solution through the preheating and vaporization zones is made possible. Moreover, the forcing of the solution through narrow tortuous passages increases the efficiency of the heat exchange relation.

The vapor that is evolved in the vaporization zone first passes downwardly through the annular passage 87 between the baffle sheets 21 and 70 and has a rotational movement imparted thereto by the louvers 86 so that the vapor in the liquid-vapor separator will have a circulatory movement in the separator. In the preferred construction, the vertical component of the vapor velocity is substantially less on the interior of the liquid-vapor separator than in the portion of the vaporization chamber on the exterior of the separator. Preferably the liquid-vapor separator is of such construction that in normal operation of the apparatus the vertical component of the vapor velocity within the separator will be about $2\frac{1}{2}$ to $3\frac{1}{2}$ feet per second. In the region of the vaporization chamber on the exterior of the liquid-vapor separator the vertical component of the vapor velocity preferably is about $3\frac{1}{2}$ to 5 feet per second. With this construction it has been found that very complete separation of liquid from vapor can be made before the vapor enters the compressor. This makes it possible to produce a distillate of very high purity. Thus, for example, in distilling sea water using a unit of the character herein described, it has been found that a distillate containing less than $\frac{1}{10}$ grain total solids per gallon can readily be obtained in one passage of the sea water through the apparatus. Distillate having as low as $\frac{2}{100}$ to $\frac{4}{100}$ grains total solids per gallon have been obtained in one passage of sea water through the apparatus.

The liquid that is trapped in the liquid-vapor separator flows downwardly through vent line 72 and may be discarded with the overflow or reintroduced into the feed. Alternatively, the liquid may be used when a partially-purified distillate is suitable for certain purposes. In the vent line 72 is the thermometer 106 and a suitable connecting means 107 whereby the temperature of the thermometer may be noted. During the normal operation of the apparatus, the compressor is operated at a speed such that vapors are removed at substantially the same rate at which they are evolved in the vaporization chamber. Moreover, fresh solution is introduced at a speed such that the overflow is maintained at a desired concentration. By introducing a thermometer into the draw-off line 72, a very satisfactory and accurate means of control is afforded. If the compressor should operate in such manner that it supplies insufficient heat to generate vapors in adequate amount to supply the compressor, this will cause air to be sucked inwardly into the line 72 until it reaches the thermometer 106. The cold air contacting the thermometer will immediately cause the reading of the thermometer to drop. If this condition occurs and is not remedied, the distillation operation will eventually stop. In order to remedy the condition, the speed of the compressor may be increased so as to increase the rate of the work done thereby and the rate at which heat is supplied to the system, and so as to cause the solution in the vaporization zone to boil at a greater rate. Alternatively, the rate of the feed may be decreased in order to remedy the condition. If, on the other hand, the thermometer shows a reading which is substantially the boiling point of the solution, this is due to the fact that too much heat is being supplied by the compressor, thereby causing steam to be passed down through the vent line 72 and out of the system. The distillation operation will continue under such conditions, but the operation will be an inefficient one. In order to remedy the condition, the rate at which the compressor is operated may be decreased or alternatively the rate at which solution is fed into the apparatus may be increased. During normal operation of the apparatus, the temperature recording of the thermometer 106 is maintained at a temperature which is intermediate between the temperature of the outside air and the boiling point of the solution, thereby indicating that the compressor is operating at the correct speed to remove the vapor at the same rate that the vapor is evolved in the vaporization zone.

The vapor that is withdrawn into the compressor is, of course, compressed therein and is distributed by the headering means into the upper ends of the coil elements of the conical coils, wherein it is condensed as hereinabove described, and, since the condensing temperature is above the boiling point of the solution, the solution in the vaporization chamber will be boiled by the heat supplied from the condensing vapors. The resulting condensate preheats the incoming solution and is collected in the headering means at the lower ends of the conical coils and flows from the system through the draw-off line.

Figure 9:
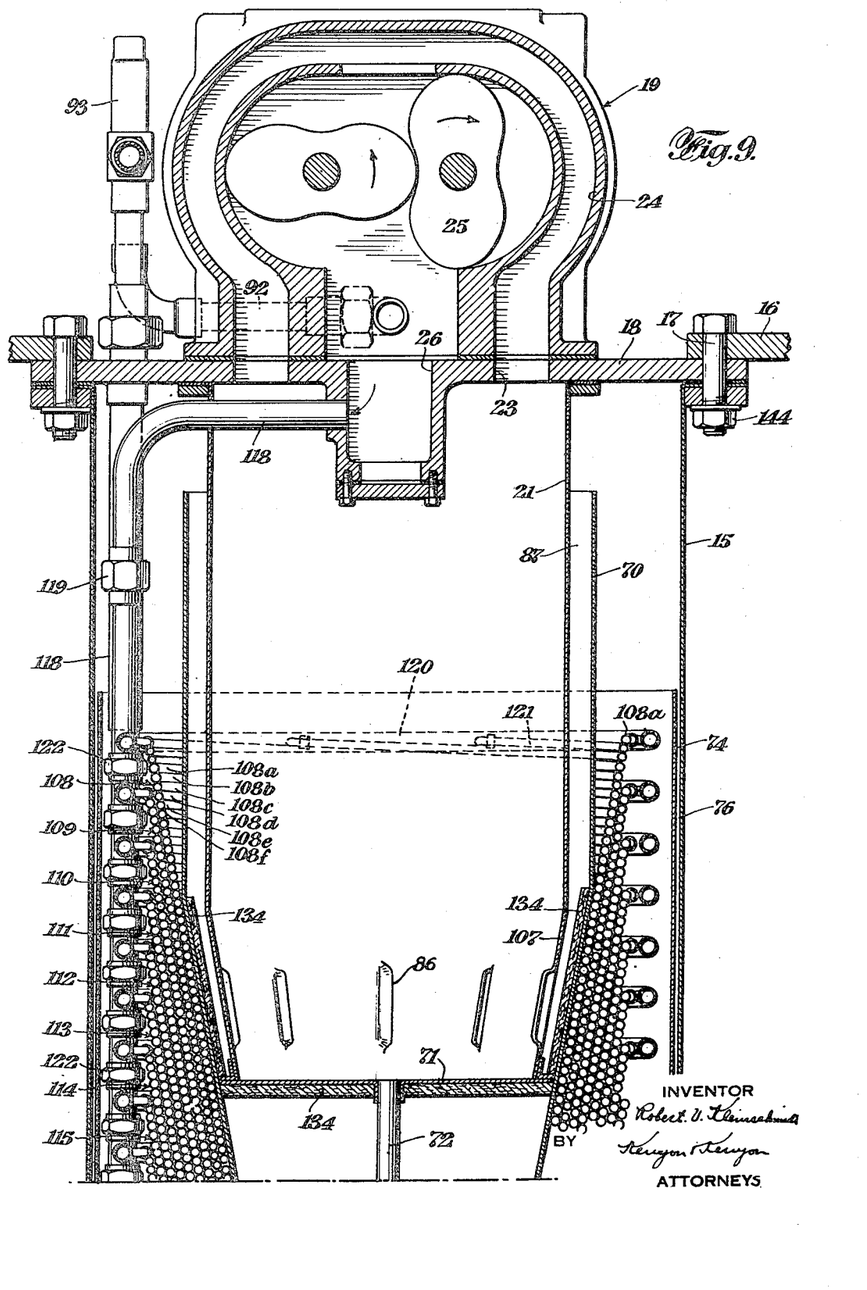
Fig. 9 is a side elevational view of the upper portion of the modified form of distillation appatus embodying this invention.
Figures 10, 11:
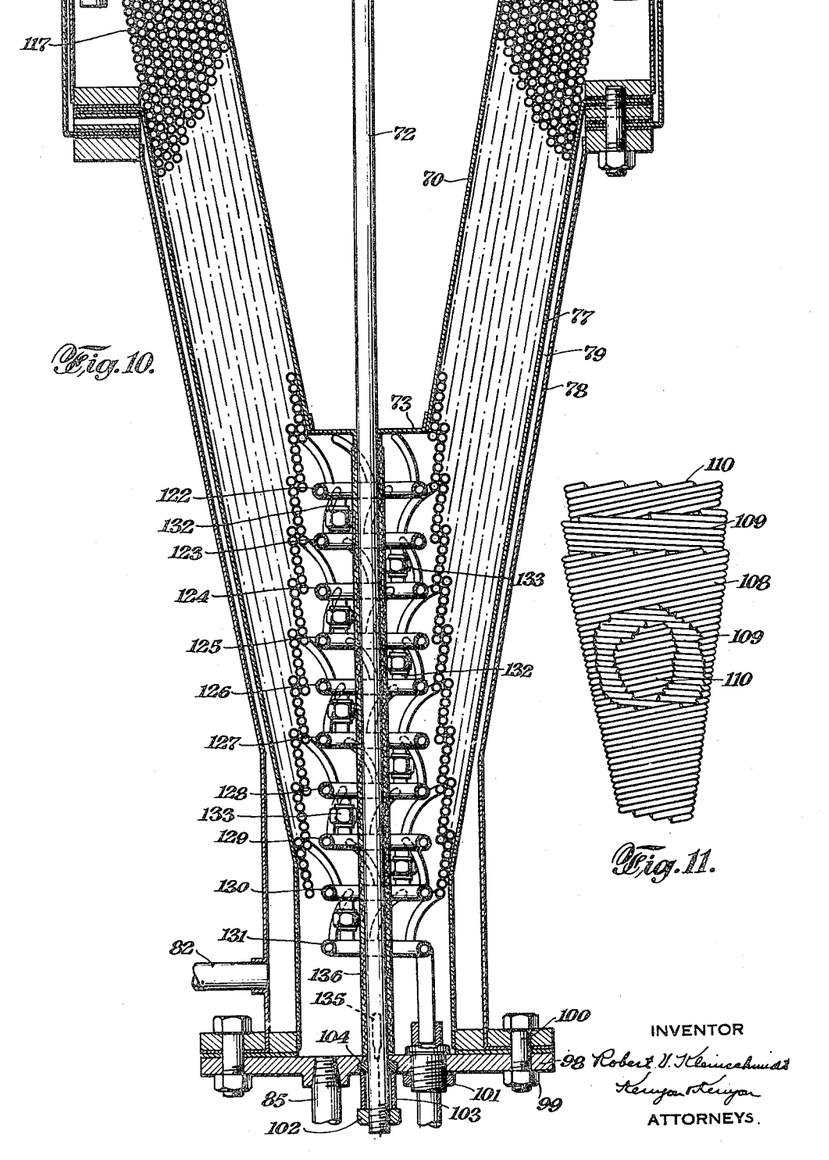
Fig. 10 is a side elevational view of the lower portion of the embodiment of this invention shown in Fig. 9, Fig. 10 being a continuation of the apparatus shown in Fig. 9.
Fig. 11 is a side elevational view, on a smaller scale, of some of the coils shown in Fig. 10, with parts thereof broken away.

In Figs. 9, 10 and 11, an alternate embodiment of this invention is shown. The mounting members 16, casting 18, and the compressor 19 may be the same as hereinabove described in connection with Figs. 1 to 8 and the parts and elements thereof have been indicated in Figs. 9 and 10 with the same reference characters employed in Figs. 1 to 8. Likewise, the vaporization chamber 15 and the means for handling overflow of hot concentrated solution may be identical with the apparatus described in connection with Figs. 1 to 8, including the wall member 74, the wall members 77 and 78, and the annular passage 79.

The liquid-vaporator separator comprises the baffle sheet 21 but this sheet instead of being straight from top to bottom, as shown in Fig. 4, has an inwardly restricted lower portion 107 in which are stamped out the louvers 108. The bottom of the liquid-vapor separator is provided by the plate 71 and any liquid entrapped in the separator is removed through the vent line 72 as described hereinabove. A baffle sheet 70 is also used, which may be of the character shown in Figs. 1 to 8. The bottom assembly including the plate 98 may also be similar to the embodiment shown in Figs. 1 to 8.

If desired, the vapor-liquid separator may have a heat insulation material 134 along the walls thereof adjacent the lower portion thereof. The insulation material may be desirable when the bottom of the vapor separator is set deeply into the conical coils to a point at or slightly below the region where incoming solution begins to boil. If the wall of the separator should be below the condensing temperature of the vapor, condensation would occur in the liquid-vapor separator and there would be a serious thermodynamic loss. The insulation can reduce such loss to a minimum. Preferably, however, the bottom of the liquid-vapor separator is at or above the region in the vaporization chamber where solution begins to boil so that the separator may be completely surrounded either by vapor or by boiling solution.

Within the vent line 72 is a thermometer 135 which in this case is located adjacent the lower end of the tube. In order that this portion of the vent line may not be excessively cooled by the incoming solution, thereby rendering the thermometer in the location shown less sensitive to variations in operating conditions, the vent line 72 is surrounded by the heat insulation material or lagging 136. The location of the thermometer in the position shown in Fig. 5 normally is preferable, however, namely, where the line 72 is surrounded by the air space between the line 72 and the wall 70 which space acts in effect as a heat insulating material.

In Figs. 9 and 10, there are ten conical coils which are indicated by the reference characters 108, 109, 110, 111, 112, 113, 114, 115, 116 and 117. Each of these coils includes six coil elements which are arranged in parallel relation to each other. Thus, for example, the uppermost coil 108 may contain the coil elements 108a, 108b, 108c, 108d, 108e and 108f.

In the modification shown in Figs. 9 and 10, the direction of winding of the piping in the conical coils instead of being in the same direction is in opposite directions (for detail see Fig. 11). Thus the coil 108 may be wound in one direction while the underlying coil 109 is wound in the opposite direction and the next subjacent coil 110 is wound in the same direction as 108. By winding the coils in this manner, it is possible to nest the coils together without employment of conical shields of the type used in connection with the embodiment shown in Figs. 1 to 8, and such shields are omitted from the apparatus shown in Figs. 9, 10 and 11. When the coils are arranged as shown in Figs. 9, 10 and 11, the coils are preferably brought together with each other so that the passages formed by the exterior surface of the piping will be of a zig-zag character from the top to the bottom of the conical coils. The passages will not, however, have as great linear length as when conical shields are used which provide, together with the piping in contact therewith, spiral passages of very small cross sections and great length. While the conical shields are omitted from the embodiment of this invention shown in Figs. 9, 10 and 11, such shields may, if desired, be utilized and it is usually regarded as preferable to do so. However, the embodiment shown in Figs. 9, 10 and 11 illustrate the fact that it is not essential to use conical shields in the practice of this invention.

The headering of the conical coils is arranged in Figs. 9 and 10 by providing a single downwardly extending line 118, the lower portion of which can be detached from the upper portion by a detachable union 119. Communicating with the downwardly extending line 118 are a plurality of header members 120, one of which is provided for the upper end of each conical coil. The upper ends of the coil elements communicate with the header members 120 and are attached thereto as by brazing or welding. For example, the coil elements 108a, 108b, 108c and 108d are shown in Fig. 9 as being attached to the uppermost of the header members 120. The lower ends of the conical coils 108, 109, 110, 111, 112, 113, 114, 115, 116 and 117 communicate with headers 122, 123, 124, 125, 126, 127, 128, 129, 130 and 131 respectively. These headers communicate with each other by lines 132 and may be disconnected from each other by the detachable unions 133. The headers 120 can be disconnected from each other by the detachable unions 122. It is apparent, therefore, that the individual conical coils with the top and bottom headers remaining integral therewith can readily be separated from each other for cleaning and reconditioning.

In connection with the previously-described embodiment of this invention, it has been pointed out how readily the unit may be disassembled for cleaning and reconditioning. This is also the case in connection with the embodiment shown in Figs. 9, 10 and 11. The bottom plate 98 and the outer walls may be removed and thereafter the conical coils may be disconnected from each other and lowered away one by one. The operation of the embodiment shown in Figs. 9, 10 and 11 is essentially the same as the operation of the embodiment of this invention shown in Figs. 1 to 8. In the embodiments shown in all of Figs. 1 to 11, it is apparent the number and size of the conical coils, the number of coil elements in each coil, the number of header members, etc., can be varied depending upon such factors as the desired capacity of the unit, the type of liquid to be handled, etc.

In order to illustrate the utility and operation of the apparatus of this invention under given operating conditions, it will be described in connection with the following typical example of the construction and operation of the apparatus.

A distilling apparatus according to this invention for producing 1500 gallons of distilled water per day from sea water may, for example, be composed of 15 conical coils each formed from 8 tube elements. Each tube element is 1/4" outside diameter by 20 gauge and has an inside diameter of .180"; and each tube element is approximately 42' long. The lower 30' of these tubes (at the small end of the conical coil) contains a square rod or wire approximately 1/8" on a side. At the top, these tubes are attached by unions to eight 1" outside diameter vertical headers having 1/16" thick walls. One tube of each conical coil is attached to each of the eight headers by a union. At the bottom, each of the eight tubes of one coil is brazed into a 3/8" O. D. semicircular header, this header in turn being connected by a union to a 3/8" iron pipe size vertical header which extends downward through the bottom plate of the still. Each coil is produced by winding on a conical form having a 4" diameter at the smaller end and approximately 19" diameter at the larger end and having an included angle of 30°, the over-all length of the cone measured along the conical surface being approximately 28".

Between the coils are placed conical shields composed of 25 gauge metal having 4" diameter at the bottom and a length of approximately 20", thus leaving the top of the coils unshielded.

The inner conical baffle extends up until it is approximately 17" in diameter, at which point the bottom of the vertical cylindrical section is attached, and adjacent which point is attached the horizontal plate forming the bottom of the vapor separator. From the center of this horizontal plate, a 1/2" iron pipe size tube extends straight down along the axis of the coils through the space within the semicircular headers and straight out through the bottom plate of the still. This pipe is the vent.

The outer wall of the heat exchanger also is conical and extends upward to a flange near the top of the lowest conical coil, at which point the flange increases the diameter to approximately 24" which is the diameter of the outer wall of the vaporization chamber, which wall is attached at the bottom thereof to the flange. Outside of the conical wall of the heat exchanger is a second wall spaced from it about 1/8" and forming the overflow passage for the heat exchanger. The over-all height of the vapor separator from the circular bottom plate to the flange which forms the top of the vapor separator and the base for the blower is approximately 18".

Inside the outer wall of the vaporization chamber and spaced therefrom by about 1/8" is another wall extending upwardly from the flange to about 1/2" above the top coil. Concentrated solution in the vaporization chamber will flow over the top of this wall down to the conical annular passage about the preheater heat exchanger. The compressor should be capable of displacing 240 cubic feet per minute of vapor at suction conditions and of developing a pressure difference of approximately 5 pounds per square inch, normally, with a maximum of 7 pounds. The water leg on the overflow discharge pipe is brought up to approximately the top of the conical portion of the outer shell. A locknut threaded on the lower end of the vent pipe just outside the bottom plate makes up against a packing which serves at once to seal the crack around the vent pipe where the latter goes through the bottom plate and at the same time serves to pull the vent pipe and the attached inner baffle cone snugly and firmly down against the conical coils. In so doing, it also forces the coils down against the conical wall on the outside of the conical coils in the heat exchanger and brings all the elements of the heat exchanger into firm, positive contact.

The remaining details of this equipment are substantially as described previously. In operation, cold sea water is led in through a flow control valve to the interior of the heat exchanger through a hole tapped in the bottom plate. It then passes up through the tortuous passages between the conical shields and the tubes of the conical coils and in the assembly described it requires approximately 4-6" water pressure to force the required flow through these tubes when cold and a somewhat higher pressure after boiling starts. As the water passes up through the heat exchanger, it is heated to boiling at approximately the time it reaches the top of the conical shields and starts to boil. The mixture of water and steam which is then rapidly increasing in volume passes up through the spaces between the coils which were occupied below by the shields as well as to a certain extent in the tortuous passages between the turns of the coils. By the time it reaches the top of the coils, a considerable portion, e. g., about 3/4 in a typical operation, of the water has been turned to steam. The remaining unevaporated water overflows the top of the inner wall of the vaporization chamber and passes down between the double exterior walls of the heat exchanger and out of the apparatus through the water leg and an overflow cup or sight drip 121 located at approximately the level of the top of the conical portion of the shell. The steam continues upward over the top of the cylindrical portion of the inner baffle, down through louvres into the interior of the vapor separator. Any traces of moisture which remain at this point are spun out against the walls of the vapor separator and flow down to the bottom and out the central vent pipe. Also any steam which is formed in excess of that which can be handled by the compressor will escape through the vent. The remaining steam passes up through the top of the vapor separator into the compressor where it is compressed to approximately five pounds pressure and forced down through header passages in the plate which forms the top of the vapor separator and becomes distributed to the eight 1" headers from which it is distributed to the various tubes of the coils. As it passes downward through the unobstructed portions of the coils, it is condensed, giving up its latent heat to evaporate more feed water on the outside of the coils. By the time it reaches the point where the square cores begin, practically the entire steam is condensed and the water formed passes down through the narrow passages between the square rods and the circular walls of the tubes, thus being effectively cooled and returning its heat to the incoming feed water. This condensate is discharged from the individual tubes into the semicircular headers at the bottom and from them into the main vertical discharge draw-off pipe by which it is discharged from the unit, forming the distilled water output.

In the exchanger described, the feed water entering may be at 50° F., the steam entering the compressor at approximately 215° F., the steam leaving the compressor at a temperature between 260 and 300° F. (depending upon the efficiency of the compressor), and the condensate leaving the system may be at approximately 70° F. The overflow may be in the vicinity of 120° F. Again, depending upon the efficiency of the compressor, the power consumption required to operate the compressor and to furnish all heat losses will be between 6 and 10 kilowatts. During operation, some scale tends to form where there is contact with incoming fresh solution or withdrawn concentrated solution. As the unit becomes foul with scale, the pressure at the compressor discharge and the temperature of the steam discharged from the compressor will gradually increase. The power consumption of the motor will also gradually increase until a point is reached at which it is no longer safe to operate the compressor continuously or at which the motor is overloaded. When this occurs, the unit is shut down and cleaned. This is simply done by dropping the outside casing and disconnecting the individual coils which are then removed and brushed inside and out with a wire brush. The conical shields between the coils are also removed and cleaned, if necessary. The coils and shields may then be reassembled, and the outer casing put on and bolted up. The unit is then ready to operate again. Since all the heating surfaces of the coils are easily accessible when the coils are disassembled, the cleaning is very easily and thoroughly done. The surfaces of the coils and their condition may be readily inspected and the entire unit is quickly put into normal operating condition again. It is not necessary to use any complicated means of getting into long lengths of small tubing nor to the outside surfaces of a multiplicity of tubes which are arranged in headers close together. Also it is found that in this type of unit the scale which forms from sea water is of a soft, granular or chalky nature and that particularly while it is wet, it is very easily brushed from the tubes. This is presumably due to the low temperatures at which the unit operates. Since the condensing temperature of the steam in the coils is only approximately 225° F. and since the amount of evaporation per square foot of coil surface is therefore relatively low, the scale does not burn on as it does in high pressure evaporators and does not need to be chipped or hammered off as is frequently the case in other types of unit.

In the structures above described, the rod or wire on the inside of the piping may, if desired, be of a poly-sided cross-sectional shape other than square, e. g., triangular, hexagonal, etc. In any such case, the rod or wire leaves restricted passages between it and the inner surface of the piping and at the same time contacts the inner surface of the piping to maintain it in proper position within the piping.

While the apparatus described has been referred to herein as distillation apparatus, there are features of this invention that have utility for carrying out operations other than those which involve evaporation or condensation of a liquid, e. g., for carrying out heat exchange between two fluids.

While this invention has been described in connection with certain specific embodiments and specific examples thereof, it is to be understood that this has been done for purposes of illustration and that apparatus of this invention may be varied within the scope of the invention. Thus, for example, the passage means between or comprised in the cone-shaped members of the preheater heat exchanger may take different forms from the forms shown. From certain aspects, the features of this invention have especial utility in combination, but other features of this invention are useful per se in distillation apparatus and in other apparatus adapted for their employment. Accordingly, the scope of this invention is to be governed by the language of the following claims construed in the light of the foregoing description of this invention.

I claim:

1. Distillation apparatus which comprises a chamber, a plurality of conical coils of piping nested together in said chamber and confined between conical wall members, said conical coils being vertically disposed with the larger ends upwardly, a liquid-vapor separator within said chamber, a compressor, means for directing vapor from said liquid-vapor separator to said compressor for compression therein, means for directing compressed vapor from said compressor to the upper ends of said coils, means for feeding solution to be distilled into said chamber adjacent the lower ends of said coils, and means for directing concentrated solution from said chamber, said conical wall members being arranged to direct said incoming solution among said conical coils in out-of-contact heat-exchange relation with vapor and vapor condensate in the piping of said coils.

2. Distillation apparatus, according to claim 1, including means for decreasing the cross-sectional flow capacity of the piping of said coils in the lower portion thereof and means for decreasing the cross-sectional flow capacity of spaces between said coils adjacent the lower portion of said coils.

3. Distillation apparatus, according to claim 1, wherein said liquid-vapor separator is at least partially surrounded by the uppermost of said conical coils, and wherein there is a vapor space above the upper ends of said coils and between the wall of said chamber and said liquid-vapor separator, the flow capacity of said space being not greater than the flow capacity of the space within said liquid-vapor separator.

4. Distillation apparatus which comprises a vaporization chamber, a plurality of conical coils nested together in said chamber, said coils being vertically disposed with the larger ends upward, an inside conical wall member immediately proximate to the inner side of the uppermost coil and having an upwardly extending annular wall extending into a vapor space in said chamber above said coils, a conical wall member in immediately proximate relation to the outside of the lowermost of said conical coils, means for feeding solution into the apparatus adjacent the lower ends of said coils, said conical wall members being arranged to direct solution fed into the apparatus among the said coils in out-of-contact heat-exchange relation with fluid in the piping of said coils, an annular baffle member extending downwardly from the top of said vaporization chamber and spaced inwardly from said annular wall member and arranged to provide an annular space between said wall members for downward movement of vapor from the vapor space above said coils in said chamber, a laterally-extending plate providing the bottom of a liquid-vapor separating chamber that has said downwardly-extending baffle member as a side wall, aperture means adjacent the lower part of said downwardly-extending baffle member for passage of vapor from said annular passage to the interior of said liquid-vapor separating chamber, a vent line arranged for directing liquid from said liquid-vapor separating chamber, a compressor, means for directing vapor from said liquid-vapor separating chamber to said compressor for compression therein, means for directing compressed vapor from said compressor to the upper ends of the piping of said conical coils, and means for directing concentrated solution from said vaporization chamber.

5. Distillation apparatus which comprises a vaporization chamber, a plurality of conical coils of piping vertically disposed in said chamber, each coil being similar in dimensions to the other coils and the coils being nested together with passage spaces therebetween, a vapor separator in said vaporization chamber at least partially surrounded by the uppermost of said coils, a mounting plate, means for suspending said vaporization chamber and said separator below said mounting plate, a compressor secured to the upper side of said plate, and inlet passage associated with said compressor in registration with an aperture in said mounting plate that affords communication between said separator and said inlet passage, a discharge passage associated with said compressor, passage means in said mounting plate in registration with said discharge passage, header means that is adapted to direct vapor from said passage means to the upper ends of the piping of said coils and that includes detachable unions permitting ready detachment of individual coils, second header means for the lower ends of said coils that includes detachable unions permitting ready detachment of individual coils, means for directing a solution into said chamber and for directing said solution through spaces between said coils in out-of-contact heat-exchange relation with fluid in the piping of said coils, means for directing concentrated solution from said vaporization chamber, and a vent line for directing liquid from said liquid-vapor separator to the exterior of said chamber.

6. Distillation apparatus, according to claim 5, wherein said liquid-vapor separator includes a vapor inlet passage adapted to direct vapors downwardly, a cylindrical inner chamber, and means between said inlet passage and said inner chamber adapted to impart a rotary motion to vapor entering said chamber, said chamber being arranged so that vapor is introduced adjacent the bottom thereof and is withdrawn from the top thereof through said aperture in said mounting plate.

7. Distillation apparatus which comprises in combination a chamber, a compressor mounted above said chamber, means for directing vapors from said chamber into said compressor for compression therein, a plurality of vertically extending conical condenser coils in said chamber nested one within another with the larger ends upwardly and arranged to maintain a vapor condensing therein in out-of-contact heat exchange with solution in said chamber, header means for directing vapor from said compressor to the larger ends of said conical coils, header means for directing condensate from the smaller ends of said coils, means for feeding a solution into said chamber, and means for directing concentrated solution from said chamber, said conical coils being confined between conical wall members arranged to direct solution fed into said chamber among said coils from adjacent the lower ends of said coils to adjacent the upper ends of said coils.

8. Distillation apparatus comprising a vaporization chamber, a liquid-vapor separator in said vaporization chamber, means for directing vapor from said chamber to within said separator, a compressor, means for directing a vapor from said separator to said compressor for compression therein, condenser heat-exchange means in said chamber, means for directing compressed vapor from said compressor to said condenser heat-exchange means in out-of-contact heat-exchange relation with solution in said chamber, means for introducing solution into said chamber, and means for withdrawing concentrated solution from said chamber, said liquid-vapor separator including a liquid-vapor separator chamber having a flow capacity for vapor that is greater than the flow capacity for vapor of vapor space within said chamber outside of said liquid-vapor separator and downwardly extending passage means arranged to direct vapor downwardly from said vaporization chamber to the interior of said liquid-vapor separator chamber.

9. Distillation apparatus which comprises a vaporization chamber, means for introducing solution to be distilled into said chamber, means for withdrawing concentrated solution from said chamber, a plurality of conical coils of piping vertically disposed in said chamber with the larger ends upwards and nested within each other, a liquid-vapor separator in said chamber and at least partially surrounded by the uppermost of said coils, means for directing vapor from said chamber into said separator, a compressor attached to the upper end of said liquid-vapor separator, the wall of said separator being apertured to permit vapors to pass from said separator to said compressor, and means for directing compressed vapors from said compressor to said coils, including header means for directing the compressed vapor into said coils in parallel relation and in out-of-contact heat-exchange relation with solution in the chamber.

10. Distillation apparatus which comprises a vaporization chamber, a heat-exchanger in said chamber including a vertically-disposed conical coil of piping with the larger end upward, means for introducing a vapor to be condensed into the interior of said piping, means for directing a solution to be distilled in contact with the exterior of said piping, and a liquid-vapor separator located so that at least part thereof is surrounded by the upper end of said coil, and means for directing vapor evolved in said chamber into said liquid-vapor separator.

11. Distillation apparatus, according to claim 10, and including a vent line leading from the interior of said liquid-vapor separator to the exterior of said vaporization chamber and arranged to draw off liquid from said liquid-vapor separator.

12. Distillation apparatus which comprises a vaporization chamber, a compressor, means for directing vapor from said chamber to said compressor for compression therein, condenser heat-exchange means in said chamber, means for directing vapor compressed by said compressor from said compressor into said condenser heat-exchange means in out-of-contact heat-exchange relation with solution in said chamber, means for directing solution into said chamber, means for withdrawing concentrated solution from said chamber, a line communicating between the vapor space in said chamber and the atmosphere on the exterior of said chamber, said line being unobstructed and arranged to provide free passage of vapor from the interior of said vaporization chamber to the external atmosphere and free passage of external atmosphere to the interior of said chamber depending upon the relative pressures of the vapor within said chamber and of the external atmosphere, and a thermometer in said line adapted to indicate the temperature of gas or vapor in said line.

13. Distillation apparatus which comprises a mounting plate held in position by supports, a compressor mounted on the upper side of said mounting plate, a vaporization chamber detachably suspended underneath said mounting plate, condenser heat-exchange means in said chamber and detachably suspended underneath said mounting plate, means for directing vapor from said vaporization chamber to said compressor for compression therein, means for directing compressed vapor from said compressor to said condenser heat-exchange means in out-of-contact heat-exchange relation with solution in said chamber means for introducing solution into said chamber, and means for withdrawing concentrated solution from said chamber, said condenser heat-exchange means including header means and a plurality of coils each of which is detachably secured thereto and arranged to be lowered away therefrom upon detachment for disassembly.

14. Distillation apparatus which comprises a chamber, a plurality of vertically disposed conical coils of piping within said chamber nested together, with the larger ends upward, conical shields between said coils of piping, a compressor, means for directing vapor from said chamber to said compressor for compression therein, means for directing vapor compressed by said compressor to the piping of said coils adjacent the larger ends thereof, means for introducing fluid into said chamber adjacent the lower ends of said coils, means including conical wall members between which said conical coils are confined for directing fluid from adjacent the lower ends of said coils to adjacent the upper ends of said coils among said coils and in contact with the exterior surface thereof and means for withdrawing concentrated solution from said chamber.

15. Distillation apparatus comprising a plurality of vertically disposed conical coils nested together with the larger ends uppermost and with passage means therebetween through which a fluid can pass from adjacent the lower end to adjacent the upper end of the coils, a first conical wall member immediately proximate to the outermost of said coils, a second conical wall member immediately proximate to and within the innermost of said coils, means for directing a heat supplying fluid into the upper ends of said coils and downwardly through said coils, means for feeding fluid into the space between said conical wall members adjacent the lower end of said coils, means communicating with spaces between said coils for withdrawing concentrated solution and vapor from said spaces, and means for separating said withdrawn concentrated solution from said withdrawn vapor said wall members being arranged to direct the incoming fluid through said spaces between said coils.

16. Distillation apparatus, according to claim 14, which includes means for positively drawing said conical wall members toward each other with said conical coils therebetween.

17. Distillation apparatus comprising a chamber, means for introducing solution into said chamber, means for withdrawing concentrated solution from said chamber, a plurality of conical coils of piping in said chamber nested together, a compressor, means for directing vapor from said chamber to said compressor for compression therein, means for directing compressed vapor from said compressor to the piping at the larger ends of said coils, said means including common header means for said coils, and detachable union means between the individual coils and said header means so that said coils can readily be disassembled and assembled in nested relation.

18. Heat-exchange apparatus comprising a plurality of conical coils of piping nested together in contact with conical shields of sheet material between said coils leaving passage means between the exterior surface of said piping and said sheet material, said passage means being formed by the wall surface of said conical shields and the exterior of said piping so as to be substantially impervious and follow the tortuous path of the coils of piping for parallel flow of fluid within said piping and within said passage means, means for directing a fluid through said piping and means for directing other fluid through said passage means in out-of-contact heat-exchange relation with fluid in said piping.

19. Heat-exchange apparatus, according to claim 18, wherein said coils are substantially identical in dimensions.

20. Heat-exchange apparatus, according to claim 18, wherein said coils are substantially identical in dimensions and are wound in the same direction.

21. Heat-exchange apparatus, according to claim 18, wherein said conical shields do not extend fully to the larger-end of the conical coils so that piping of said conical coils does not have said shield members therebetween in the region adjacent the larger end of said coils.

22. Heat exchange apparatus comprising a plurality of coils of coiled piping nested one within another, means for directing a fluid through the piping of said coils, shield members of annular cross section between said coils of coiled piping and in contact therewith and arranged to provide barrier means separating said coils from each other, at least one end of said shield members terminating intermediate the ends of said coils, means for substantially restricting the cross-sectional flow capacity of the piping of individual coils throughout substantial longitudinal extent thereof adjacent the shield members in contact with the inner side thereof, said means for substantially restricting the flow capacity of the piping terminating adjacent said end of said shield members, and means for directing another fluid through spaces between said coils and between said coils and said shield members in out-of-contact heat exchange relation with fluid within the piping of said coils.

23. Heat exchange apparatus comprising a plurality of coils of coiled piping nested one within another, means for directing a fluid through the piping of said coils, shield members of annular cross section between said coils of coiled piping and in contact therewith and arranged to provide barrier means separating said coils from each other, the individual shield members being about two-thirds to seven-eighths the side wall length of the coils of piping and having one end adjacent the end of a contacting coil, and means for directing another fluid through spaces between said coils and between said coils and said shield members in out-of-contact heat exchange relation with fluid within the piping of said coils.

24. Distillation apparatus which comprises a chamber, a compressor, means for directing vapor from said chamber to said compressor for compression therein, a plurality of conical coils of piping nested together within said chamber having passage means therebetween, means for directing vapor compressed by said compressor into the interior of said piping of said coils, means for introducing liquid into said chamber and through said passage means in out-of-contact heat exchange relation with fluid in said piping, and means for withdrawing concentrated solution from said chamber.

25. Distillation apparatus which comprises a chamber, a compressor, means for directing vapor from said chamber for compression therein, coiled piping within said chamber, means for directing vapor compressed by said compressor into the interior of said piping, means for directing solution into said chamber in out-of-contact heat exchange relation with fluid in the interior of said piping, and means for withdrawing concentrated solution from said chamber, said piping containing therein a wire of polysided cross-section that partially fills the cross section of said piping leaving restricted passage means between the sides of said wire and the inner surface of said piping.

26. Distillation apparatus which comprises a chamber, a compressor, means for directing vapor from said chamber to said compressor for compression therein, a plurality of coils of coiled piping nested one within the other in said chamber, means for directing vapor compressed by said compressor into the interior of said piping of said coils, shield members between said coils of coiled piping and in contact therewith, means for directing solution into said chamber and between said coils and between said coils and said shield members in out-of-contact heat exchange relation with fluid within the piping of said coils, and means for withdrawing concentrated solution from said chamber.

27. Distillation apparatus which comprises a vaporization chamber, a compressor, a condenser heat-exchanger, means for directing compressed vapor from said compressor to said condenser heat-exchanger in out-of-contact heat-exchange relation with solution in said chamber, a liquid-vapor separator located in said chamber and arranged to isolate the interior thereof from the interior of said vaporization chamber except for restricted vapor inlet means communicating between the interior of said liquid-vapor separator and the vapor space above the normal liquid level within said chamber, means for directing vapor from said liquid-vapor separator to said compressor for compression therein, means for feeding solution into said vaporization chamber, means for withdrawing concentrated solution from said vaporization chamber, a vent line arranged for directing liquid separated from said vapor in said liquid-vapor separator from said liquid-vapor separator to the exterior of said vaporization chamber, said vent line being unobstructed and arranged to provide free passage of vapor from said liquid-vapor separator to the atmosphere on the exterior of said vaporization chamber and free passage of atmosphere on the exterior of said vaporization chamber to the interior of said liquid-vapor separator depending upon the relative pressures of the vapor within said liquid-vapor separator and of the external atmosphere, and a thermometer in said vent line adapted to indicate the temperature of gas or vapor in said line.

ROBERT V. KLEINSCHMIDT.

REFERENCES CITED

The following references are of record in the file of this patent:

UNITED STATES PATENTS

| Number | Name | Date |
| --- | --- | --- |
| 159,728 | Wetherill | Feb. 9, 1875 |
| 592,041 | Apelt | Oct. 19, 1897 |
| 621,537 | Ostergren et al. | Mar. 21, 1899 |
| 812,889 | Slheetz | Feb. 20, 1906 |
| 849,579 | Siebel | Apr. 9, 1907 |
| 1,045,023 | Keisserman, Jr. | Nov. 19, 1912 |
| 1,091,369 | Mejani | Mar. 24, 1914 |
| 1,142,826 | McElheny | June 15, 1915 |
| 1,150,713 | Soderlund | Aug. 17, 1915 |
| 1,213,596 | De Baufre | Jan. 23, 1917 |
| 1,278,311 | Davis | Sept. 10, 1918 |
| 1,769,265 | Labus | July 1, 1930 |
| 1,901,090 | Eule et al. | Mar. 14, 1933 |
| 2,032,134 | Larkin | Feb. 25, 1936 |
| 2,050,465 | Salvo et al. | Aug. 11, 1936 |
| 2,071,624 | Graham | Feb. 23, 1937 |
| 2,185,595 | Kleinschmidt | Jan. 2, 1940 |
| 2,202,007 | Ittner | May 28, 1940 |

FOREIGN PATENTS

| Number | Country | Date |
| --- | --- | --- |
| 6,078 | Great Britain | Mar. 22, 1906 |
| 54,390 | Norway | Oct. 8, 1934 |
| 565,150 | Germany | Nov. 26, 1932 |